United States Patent [19]

Zumbrunn et al.

[11] Patent Number: 5,003,187
[45] Date of Patent: Mar. 26, 1991

[54] METHOD AND APPARATUS FOR SURVEYING THE SURFACE OF AN OBJECT BY PROJECTION OF FRINGE PATTERNS

[75] Inventors: Roland Zumbrunn, Wittinsburg; Linus Richner, Kölliken, both of Switzerland

[73] Assignee: Kern & Co., AG, Aarau, Switzerland

[21] Appl. No.: 465,788

[22] Filed: Jan. 17, 1990

[30] Foreign Application Priority Data

Jan. 17, 1989 [CH] Switzerland .................. 00140/89

[51] Int. Cl.$^5$ ............................................ G01N 21/86
[52] U.S. Cl. ....................................... 250/560; 356/376
[58] Field of Search ...................... 250/560, 561, 571; 356/376

[56] References Cited

U.S. PATENT DOCUMENTS 4,895,448 1/1990 Laird .................................. 356/376

FOREIGN PATENT DOCUMENTS 0182469 5/1986 European Pat. Off. .

OTHER PUBLICATIONS

"Interferometric Optical Phase Measurement Techniques", Dissertation of C. L. Koliopoulos, Univ. of Arizona, 1981.

Primary Examiner—David C. Nelms
Attorney, Agent, or Firm—Foley & Lardner, Schwartz, Jeffery, Schwaab, Mack, Blumenthal & Evans

[57] ABSTRACT

For sensing the surface of an object, a number of gratings with linear line patterns of different periods on a common carrier are successively projected onto the surface. Images of the line patterns deformed at the object surface are detected and stored by a television camera and evaluated by an electronic circuit. The evaluation comprises computing, from the residual phases of the object points within each fringe of the linear pattern, the absolute heights of these points with respect to a common reference plane.

19 Claims, 4 Drawing Sheets

METHOD AND APPARATUS FOR SURVEYING THE SURFACE OF AN OBJECT BY PROJECTION OF FRINGE PATTERNS

BACKGROUND OF THE INVENTION

The present invention relates to a method and an apparatus for surveying the surface of an object.

In the prior art, methods and apparatus for contactless determination of surface profiles of objects are known. One such method consists of projecting a periodic pattern onto the surface to be determined and evaluating a grating image deformed by the shape of the surface to compute the height of the points of the object surface with respect to a reference plane. For generating such a pattern of stripes, various methods are known. As shown by C. L. Koliopoulos in "Interferometric Optical Phase Measurement Techniques" (Dissertation, Univ. of Arizona, 1981), the stripe patterns are generated by means of a Mireau-Interferometer or a Twyman-Green-Interferometer. There, the breadth of the stripes or the period of the pattern is then essentially given by the wavelength of the light used for illumination.

As disclosed in published European Pat. application No. 182,469, the patterns of stripes may also be generated by a Shearing-Interferometer or by projection of a sine grating. In this case, the period may be determined by adjusting the shearing angle or by choosing a suitable sine grating. The in-depth resolution of such a surface measurement is mainly given by the period of the pattern of stripes.

A characteristic problem of the known methods arises if the absolute height of the object points must be found with respect to a reference plane that is fixed in space. While the height of each single object point within one stripe of the projected pattern is conveniently determined with respect to the lower edge of this stripe, i.e., there is an ambiguity in the height measurement corresponding to the period of the pattern. In order to obtain the absolute height of each object point a great number of stripes generally must be counted, which separate the respective object point from the reference plane.

SUMMARY OF THE INVENTION

An object of the present invention, therefore, is to provide a method for surveying the surface of an object which allows a simplified determination of the absolute height of object points with respect to a reference plane.

It is also an object of the invention to provide an apparatus for carrying out the desired method.

In accomplishing these objects, there has been provided a method of surveying the surface of an object, comprising the steps of directing at the object a beam of light having a periodically varying intensity pattern over its cross-section; modulating the phases of the intensity pattern of the beam of light directed at the object at the points of the surface to be surveyed; detecting and storing optoelectronically intensity values at the points of the object surface to be surveyed for a number of different modulated phases and periods lambda of the beam of light directed at the object; combining the detected intensity values for computing residual phase values within the respective periods of the intensity pattern at the points of the object surface to be surveyed for defined phase positions of the intensity patterns with respect to a reference plane, and thereafter computing from the residual phase values the heights of the points of the object surface with respect to the reference plane; and computing the absolute heights of the points of the object surface to be surveyed with respect to said reference plane, from said residual phase values for a number of different periods and defined phase positions with respect to the object surface and the reference plane of said intensity patterns of said beam of light.

There has also been provided an apparatus for carrying out the above-described method.

Further objects, features and advantages of the present invention will be readily apparent to one skilled in the pertinent art from the following detailed description of the preferred embodiments when considered in conjunction with the drawings.

DETAILED DESCRIPTION OF THE PREFERRED EMBODIMENTS

The present invention provides a method and an apparatus for surveying an object, in particular the surface of an object. The method comprises computing the absolute heights of the points of the object surface to be surveyed with respect to said reference plane, using residual phase values for a number of different periods and defined phase positions with respect to the object surface and the reference plane of the intensity patterns of a beam of radiation and in particular light directed at the object.

In a preferred embodiment the invention relates to a method of surveying the surface of an object comprising the steps of: directing at the object a beam of radiation, preferably light having a periodically varying intensity pattern along a diameter; modulating the phases of the intensity pattern of the beam of radiation, preferably light, directed at the object at the points of the surface to be surveyed; detecting and storing, by means of a detector means or an optoelectronic detector means, the intensity values at the points of the object surface to be surveyed for a number of different modulated phases and periods lambda of the beam of radiation, preferably light, directed at the object; and combining the detected intensity values, for computing the residual phase values within the respective periods of the intensity pattern at the points of the object surface to be surveyed for defined phase positions of the intensity patterns with respect to a reference plane, and for computing the heights of the points of the object surface with respect to the reference plane.

Figure 1:
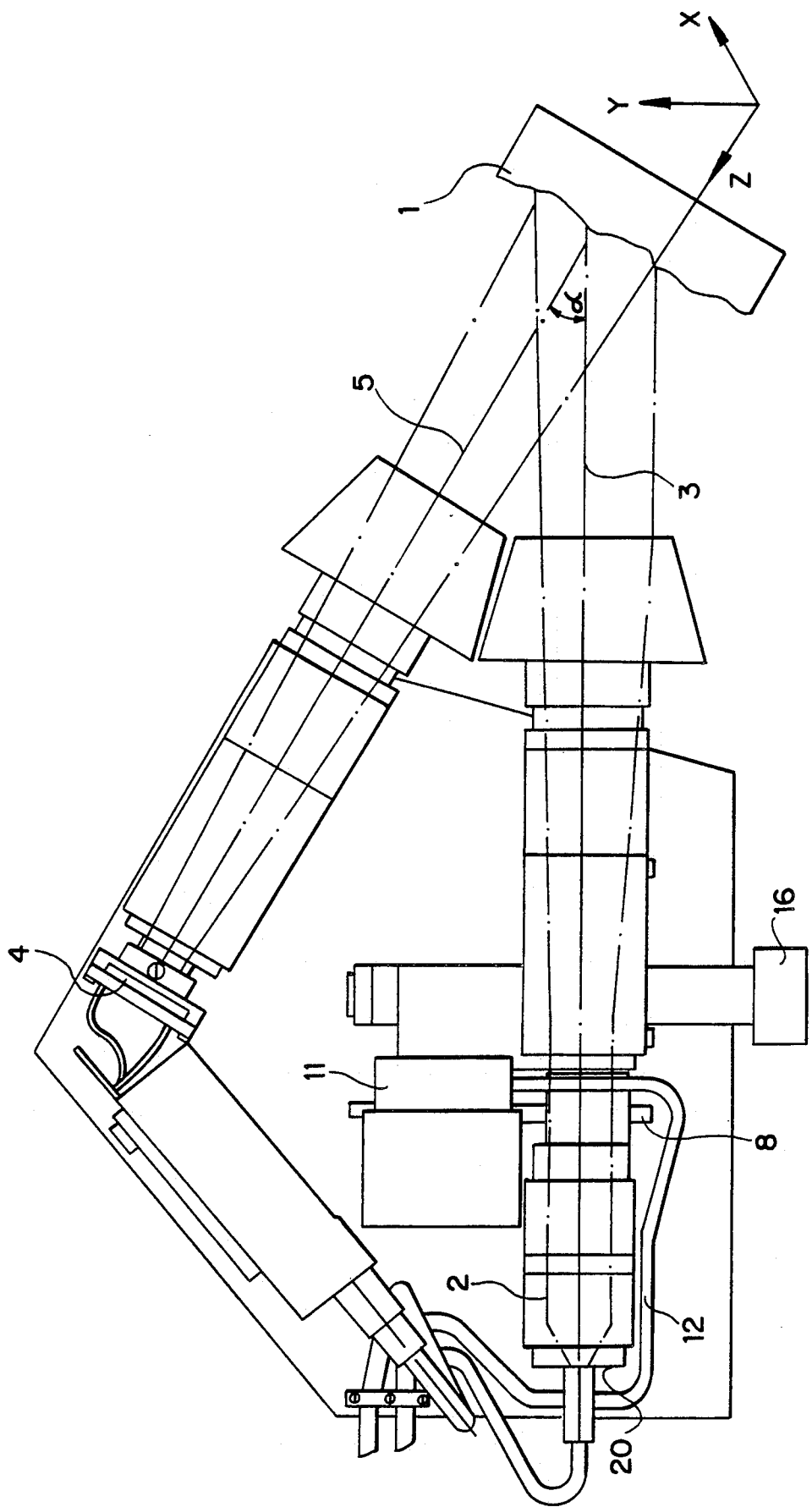
FIG. 1 is a schematic representation of a complete apparatus for surveying the surface of an object.

FIG. 1 shows an object with a surface 1 that is to be surveyed. A projector 2 having an optical axis 3 illuminates the surface 1 which is sensed by an optoelectronic detector array of a camera 4 having an optical axis 5.

Figure 2:
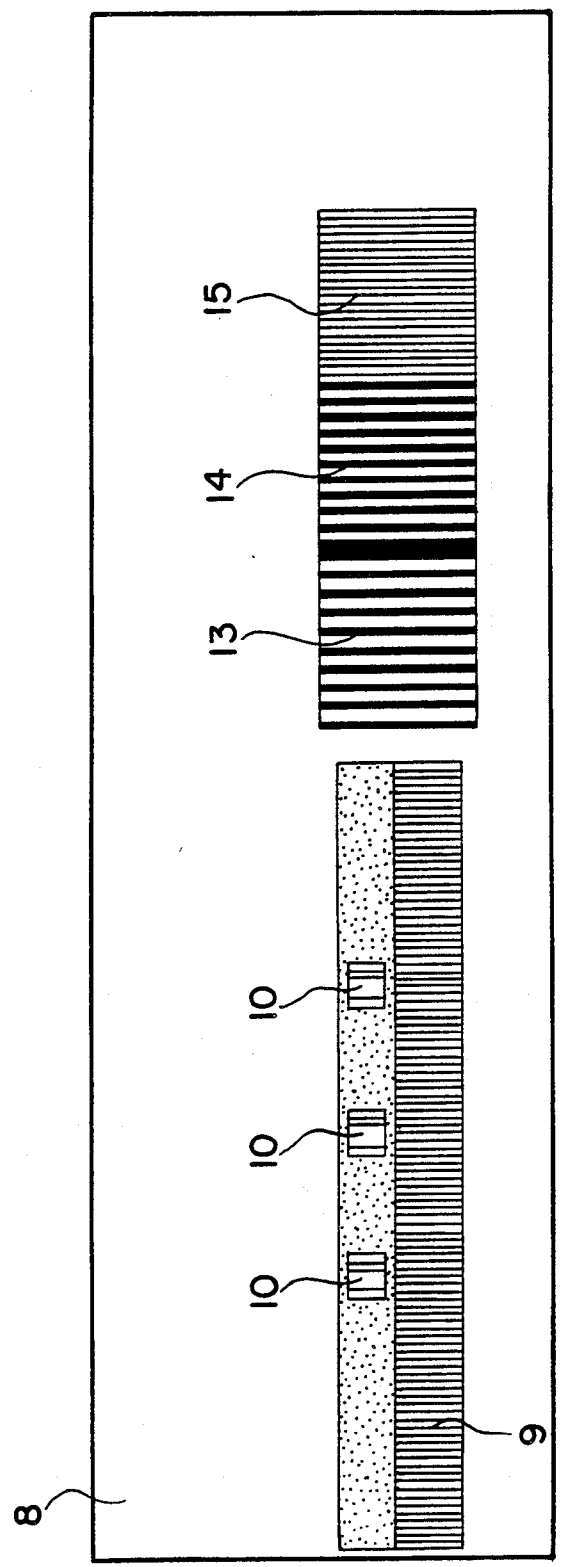
FIG. 2 shows several gratings with linear parallel fringes with different periods mounted on a common carrier.

As shown in broken lines, the beam of a light emitting diode 20 within the projector 2 is made parallel by a collimating lens. This beam of light then illuminates a number of optical gratings with linear parallel fringes mounted on a common transparent carrier 8. As shown in FIG. 2, the linear fringes of all of these gratings are oriented parallel to each other. A long grating 9 with zero marks 10 along its side has a relatively short period. Grating 9 is used to measure the position of the carrier 8, which is slideable within a guiding device fixed to the projector 2. This is achieved using an opto-electronic sensor system 11 in conjunction with the grating 9. The output signals of the system 11 are fed to a position evaluation device (not shown) by a line 12, which determines the position of the grating 9 using said output signals. The position evaluation device also supplies the sensor system 11.

Adjacent to the grating 9 are positioned three other gratings 13, 14, 15, which are projected onto the surface 1 of the object to be surveyed.

Figure 3:
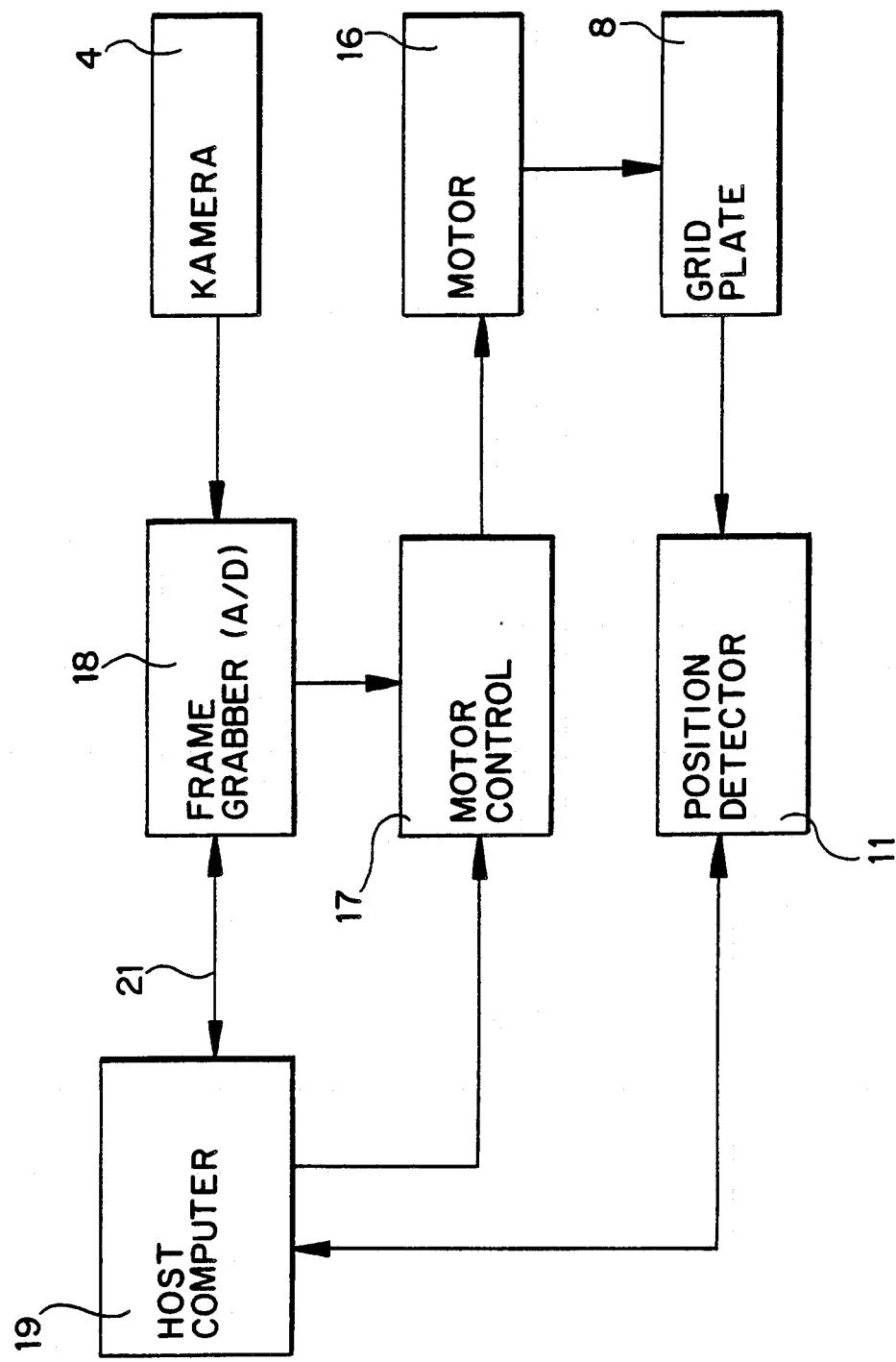
FIG. 3 is a block diagram of an electric control and evaluation circuit for the apparatus according to FIG. 1.

These three Ronchi-gratings 13, 14 and 15 are made up of straight lines and spaces of equal breadth, the period of grid 13 being 1.26 mm, the period of grid 14 being 1.12 mm and the period of grid 15 being 0.28 mm. The carrier 8 is mounted to an angle bracket and is slideable therewith in a linearly translatable positioning device. The shifts of carrier 8 are effected by a stepper motor 16 which is driven via a cable by a motor control stage 17, as shown in FIG. 3. These shifts are measured with the sensor system 11 and the grating 9, 10. After passage through one of the gratings 13, 14 or 15, the beam of the diode 20 has a periodic intensity pattern over its cross section. This beam of light is then further expanded by two lenses as required for illumination of the object 1.

The surface 1 of the object is thus illuminated by a periodic fringe pattern, which may be shifted to the right or to the left by a corresponding lateral sliding of the carrier 8. Such a uniform shift will result in a periodic change of the phase of illumination for all object points, i.e., a periodic change in the phase of the intensity of the radiation at each object point. A phase modulation of the illumination of the points is accomplished. By means of the above mentioned zero marks 10, reference signals are generated if given object points pass through certain phases of illumination.

The evaluation of the images of the gratings 13, 14 or 15 deformed at the surface 1 of the object is done in a manner described by C. L. Koliopoulos in "Interferometric Optical Phase Measurement Techniques" (Dissertation, Univ. of Arizona, 1981) under the heading "Phase Shift Method - Multi Bucket Method". The deformed images are detected by the detector array of the camera 4 and stored by a frame grabber 18 of an electronic evaluation circuit shown in FIG. 3. The evaluation is accomplished according to a predetermined timing sequence controlled by the recording standard of the camera 4.

As mentioned above, the projection of the gratings 13, 14, 15 onto the surface 1 of the object results in periodically varying intensity patterns. These patterns may be approximated by a periodic square wave function I(t) with period T. An integrating effect of the camera 4 may be represented as follows, resulting in four image sums or "buckets" A, B, C, D for each pixel of the detector array:

Four Bucket Method $$A = \frac{1}{T} \int_{-\frac{T}{8}}^{\frac{T}{8}} I(t)dt; \quad B = \frac{1}{T} \int_{\frac{T}{8}}^{3\frac{T}{8}} I(t)dt;$$

$$C = \frac{1}{T} \int_{3\frac{T}{8}}^{5\frac{T}{8}} I(t)dt; \quad D = \frac{1}{T} \int_{5\frac{T}{8}}^{7\frac{T}{8}} I(t)dt;$$

During the four time intervals $[-T/8; T/8]$, $[T/8; 3T/8]$, $[3T/8; 5T/8]$, $[5T/8; 7T/8]$ the fringe pattern is shifted with a constant speed by a total distance of one period lambda. From the quotient $$M1/M2 = (B-D)/(A-C)$$

of the stored sums, the residual phases of illumination phi can be computed and therefrom the absolute heights z of each point of the object surface corresponding to one pixel are computed.

The stepper motor 16 of FIG. 1 is controlled by the timing sequence from the recording standard of the camera 4 in such a way that the fringe pattern on object surface 1 is shifted by a total of one period during recording of the images for the above four buckets A, B, C, D. The camera 4 comprises a CCD-sensor array with more than 262,144 single sensor elements. During the pattern shift, each sensor element integrates its image point illumination for 20 ms. Thereafter, the information of one whole image is transferred to frame grabber 18 of the evaluation circuit as shown in FIG. 3.

Figure 4:
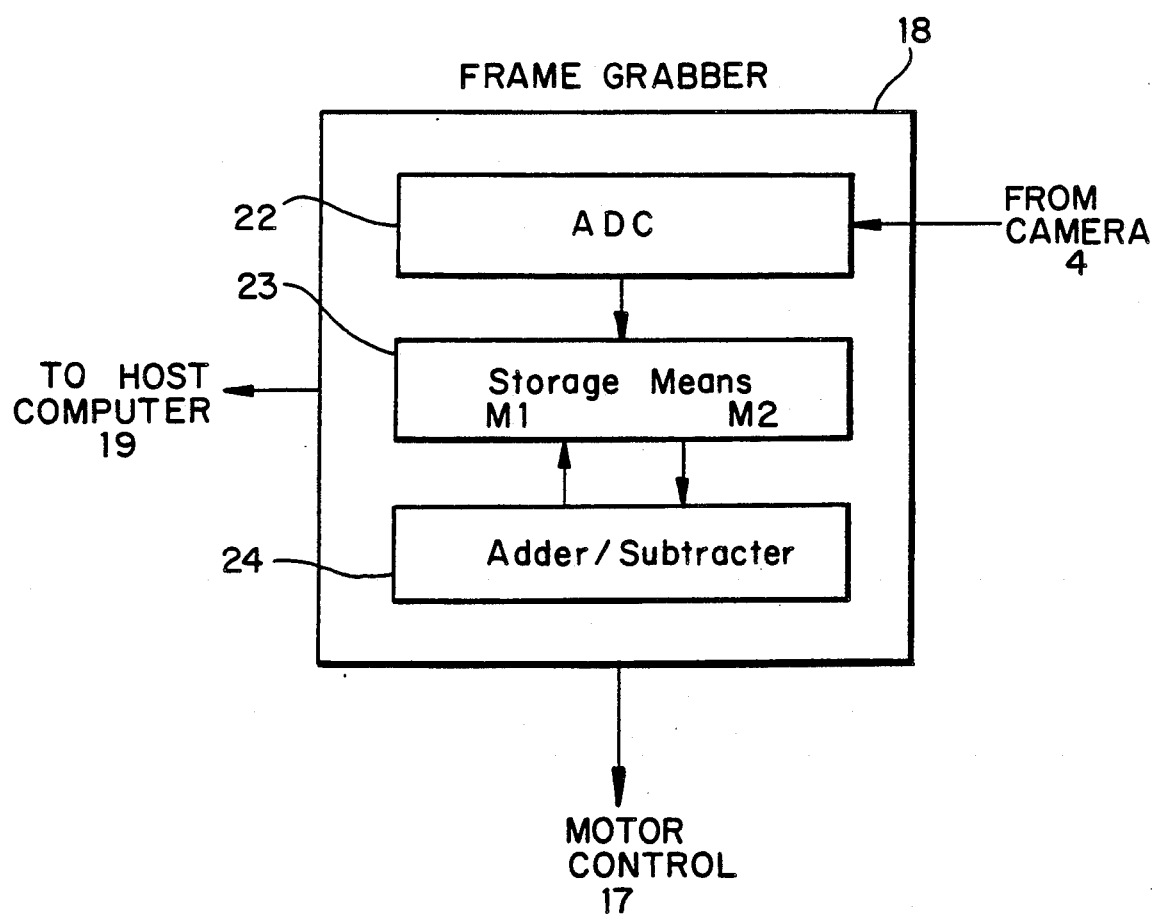
FIG. 4 is a block diagram of a frame grabber in FIG. 3.

The images output by camera 4 are pixelwise converted to a digital signal format by an analog to digital converter (ADC) 22 within frame grabber 18 as shown in FIG. 4, and stored in a storage means 23. The resulting 8-bit image pixel values are transferred to an adder/subtractor stage 24. For adding or subtracting the corresponding values of several successive images, the adder/subtractor stage 24 recalls the values stored in the storage means 23 of frame grabber 18, and after the arithmetic operation it restores the new values to these storage means 23.

The division of image sums $(B-D)$ stored in one memory of the storage means by image sums $(A-C)$ stored in the other memory of the storage means is accomplished by the frame grabber 18 using lookup tables (LUT). At first, the logarithms of both image sums are taken by means of the LUTs, then the logarithms are subtracted from each other. The inverse logarithm of the resulting difference is taken by means of another LUT, and then the arc tan of the inverse log is taken:

$$\phi = \arctan \log^{-1}(\log\{B-D\} - \log\{A-C\}).$$

Sixteen whole images are read out during one cycle. Every 4 images are summed up to give one image sum, resulting in 4 image sums A, B, C, D. After an analog to digital conversion, these image sums are summed into two 262,144-fold memories M1, M2 within frame grabber 18 according to the following sequence:

Images no. 1 to 4 summed up in memory M2 give image sum A; thereafter images no. 5 to 8 summed up in memory M1 give image sum (+B); thereafter images no. 9 to 12 subtracted from memory M2 give image sum (A−C); thereafter images no. 13 to 16 subtracted from memory M1 give image sum (B−D).

By the above described division of the stored values $$M1/M2 = (B-D)/(A-C)$$

one gets 262,144 results for the 262,144 image points, from which the relative heights Zr of the object points are $Zr = \{2\pi/\lambda\}^{-1} \cdot \phi$, where lambda is the period of the grating on the object surface. Particularly, for all values of M1 log(M1) is taken and restored to M1, for all values of M2 log(M2) is taken and restored to M2, and the differences of the stored values M1−M2 are taken and restored in M1. The required residual phase values phi within the projected grating fringes for the case of a square wave intensity pattern of the fringes are $$\phi = \arctan \log^{-1}(M1)$$

Such a calculation results in an error of about 1 per cent. In other cases phi can be obtained using a look up table (LUT), corresponding to that particular grating pattern.

As already mentioned, the relative height Zr, i.e., the height of each object point within one fringe of the projected pattern with respect to the lower edge of this fringe, is given by the residual phase values phi calculated as described above. It will now be shown how the absolute heights z of the points of the object surface to be surveyed with respect to a reference plane are determined using the residual phase values for a number of different periods of the intensity patterns on the surface 1 of the object.

If the optical axes 3 and 5 of projector 2 and camera 4, as shown in FIG. 1, are at an angle alpha, the periods lambda effective for the measurement of the heights are changed by a factor 1/cos(alpha) with respect to the periods lambda(0) of the projected fringe patterns. Suppose now, that two fringe patterns with effective periods lambda(1) and lambda(2) are projected so that their phases are equal for a given reference height and position of an object point; that lambda(1) > lambda(2), say lambda(2) = (P/q)lambda(1) with p and q integral numbers and q−p=1; and that a given point of the surface 1 of the object, with respect to the two fringe patterns has the normalized residual phases phi(1) and phi(2) with $0 \leq \phi < 1$.

The absolute height z of the given point may then be represented as $$z = \lambda(1) * [n(1) + \phi(1)]$$

$$z = \lambda(2) * [n(2) + \phi(2)],$$

where n(1) or n(2) whole fringes separate the given point from the given reference height. With the abbreviation $$M(2) \equiv n(2) - n(1)$$

z = lambda(1)*[p*M(2) − q*phi(1) + p*phi(2) + lambda(1)*phi(1). If the measuring range of the height of the object is limited to $$0 \leq n(1) < p$$

$$0 \leq n(2) < q,$$

then M(2) turns out to be $$M(2) = \begin{cases} 0, & \text{if } \phi(2) \geq \phi(1) \\ 1, & \text{if } \phi(1) > \phi(2) \end{cases}$$

Thus, the absolute height z of the given point is fully determined.

By comparing the representations of z:

$$z = \lambda(1) * [n(1) + \phi(1)]$$

$$z = \lambda(1) * [p*M(2) - q*\phi(1) + p*\phi(2) + \phi(1)]$$

and because M(2), p and q are integer numbers, it follows that $$r \equiv -q*\phi(1) + p*\phi(2)$$

must be an integer number if the residual phases phi(1) and phi(2) are free of measurement errors. In practical cases however, phi(1) and phi(2) are not free of such errors, and therefore, the value of r may be used as a criterion to test phi(1) and phi(2), and r must be rounded to the nearest integer m(r) to compute n(1)=p*M(2)+m(r). This calculation is accomplished by a host computer 19 shown in FIG. 3, which is connected to the frame grabber 18 by a line 21.

In comparison to the prior art methods, the method according to the invention has the following advantages: The absolute heights of each point of the object surface 1 are obtained independently of the height of the neighboring points. Hence, rather complicated surfaces with steps and discontinuous isolated portions may be surveyed. The embodiment described above may be used in various ways and/or with numerous variations, depending upon the nature of the surveying problem. For example, the accuracy of the computed absolute heights z may be improved by calculating the residual phase values using an intensity pattern having a period substantially smaller than the periods of the intensity patterns of light already used to calculate the absolute hights z. The method according to the invention is useful whenever an object surface is surveyed by illumination with periodic patterns, such as for interferometers, interference microscopes and for systems with projection of general patterns for determination of technical surfaces.

The presently disclosed embodiments are therefore considered in all respects to be illustrative and not restrictive. The scope of the invention is to be determined by the appended claims, all equivalents thereof.

What is claimed is:

1. A method of surveying the surface of an object, comprising the steps of:

directing at the object a beam of light having a periodically varying intensity pattern over its cross-section;

modulating the phases of the intensity pattern of the beam of light directed at the object at the points of the surface to be surveyed;

optoelectronically detecting and storing the intensity values at the points of the object surface to be surveyed for a number of different modulated phases and periods lambda of the beam of light directed at the object;

combining detected intensity values for computing residual phase values within the respective periods of the intensity pattern at the points of the object surface to be surveyed for defined phase positions of the intensity patterns with respect to a reference plane, and thereafter computing from the residual phase values the heights of the points of the object surface with respect to the reference plane; and computing the absolute heights of the points of the object surface to be surveyed with respect to said reference plane, from said residual phase values for a number of different periods and defined phase positions with respect to the object surface and the reference plane of said intensity patterns of said beam of light.

2. A method as claimed in claim 1, wherein said directing step is accomplished by using a first and a second intensity pattern, the period lambda(1) of the first pattern being greater than the period lambda(2) of the second pattern, wherein the relation q*lambda(2)=p*lambda(1) with p, q being integral numbers and p−q=1 holds, and wherein said computing step is accomplished by using the relation z=lambda(1)*{p*M(2)−q*phi(1)+p*phi(2)}, wherein $$M(2) = \begin{cases} 0, \text{ if phi}(2) \geq \text{phi}(1) \\ 1, \text{ if phi}(2) < \text{phi}(1), \end{cases}$$

z are the absolute heights and
phi(1), phi(2) are the residual phase values.

3. A method as claimed in claim 2, further including the step of using the ratio (p/q) of the periods lambda and the residual phase values phi computed in said combining step to compute a test quantity r=−q*phi(1)+p*phi(2)

for testing and/or improving the accuracy of measurement of the residual phase values phi, the value of r being integral if the computed residual phase values phi are free of errors; and rounding r to the nearest integral value m(r) to compute the number n=p*M(2)+m(r)

of whole fringe periods contained in the absolute height value z.

4. A method as claimed in claim 1, further including the steps of detecting and storing further intensity values for a period substantially smaller than the periods of the beam of light used in said first-recited detecting and storing step; combining said further detected intensity values for computing further corresponding residual phase values; and computing absolute heights of improved accuracy from said further corresponding residual phase values and from the absolute heights already computed in said first-recited computing step.

5. A method as claimed in claim 1, wherein said directing step is accomplished by using linear parallel fringe patterns with bright and dark fringes of equal width as periodically varying intensity patterns, and by using two intensity patterns with different periods lambda; wherein said combining step is accomplished by using intensity values where the defined phase positions of the two intensity patterns for computing the residual phase values coincide, and by computing the residual phase values phi by summing groups of optoelectronically detected intensity values, forming differences between the summed groups A, B, C, D and dividing some differences by other differences.

6. A method as claimed in claim 5, wherein said combining step is accomplished by storing the differences B−D and A−C for all points of the object surface in corresponding first and second multi-storage means M1 and M2 for dividing the differences of the summed groups A, B, C, D of the optoelectronically detected intensity values; computing the logarithm of the differences B−D in said first multi-storage means M1; computing the logarithm of the differences A−C in said second multi-storage means M2; forming and storing in said first multi-storage means M1 the differences log M1 −log M2 of the logarithms of the differences; and computing the residual phase values phi of the object points by taking the arc tan of the inverse log of the differences log M1−log M2 stored in said first multi-storage means M1.

7. An apparatus for surveying the surface of an object comprising:

means for directing at the object a beam of light having a periodically varying intensity pattern over its cross-section;

means for modulating the phases of the intensity pattern of the beam of light directed at the object at the points of the surface to be surveyed;

an optoelectronic detector means for detecting and storing intensity values at the points of the object surface to be surveyed for a number of different modulated phases and periods lambda of the beam of light directed at the object;

means for combining detected intensity values to compute the residual phase values within the respective periods of the intensity pattern at the points of the object surface to be surveyed for defined phase positions of the intensity patterns with respect to said means for directing a beam of light at the object; and means for computing from the residual phase values the heights of the points of the object surface with respect to a reference plane;

said means for directing and for modulating comprising a number of gratings, with linear parallel fringes different periods, mounted on a common carrier within said beam of light;

at least one further grating with reference marks mounted on said common carrier, said gratings with linear parallel fringes having defined phase positions with respect to said further grating; and means for defined displacing said common carrier and for scanning said one further grating in order to position said gratings with linear parallel fringes within said beam of light to provide the corresponding intensity patterns with the required defined phase positions with respect to the surface of the object.

8. An apparatus as claimed in claim 7, wherein one of said gratings with linear parallel fringes mounted on the common carrier with defined phase positions has a period substantially smaller than the periods of said gratings having linear parallel fringes producing the intensity patterns for computing the absolute heights of the points of the object surface with respect to a reference plane; and means are provided for computing absolute heights of improved accuracy from the residual phase values corresponding to said grating with a substantially smaller period and the absolute heights already computed with said means for combining and computing.

9. An apparatus as claimed in claim 7, wherein said optoelectronic detector means comprises means for output, according to a predetermined timing sequence, of the intensity values corresponding to the respective points of the object surface or of their images; and wherein said means for defined displacement of said common carrier comprise a stepper motor and a corresponding electronic control circuit, said control circuit controlling the stepper motor synchronously with the predetermined timing sequence for detecting and storing the intensity values of the points of the object surface for a number of different modulated phases of the beam of light directed at the object.

10. A method of surveying an object comprising the steps of:
directing at the object a beam of radiation with a periodically varying intensity pattern along a diameter of the beam;
modulating the phases of the periodically varying intensity pattern of the beam of radiation directed at the object at points of the object to be surveyed;
detecting and storing the intensity values at the points of the object to be surveyed for a number of different modulated phases and periods lambda of the beam of radiation directed at the object;
combining detected intensity values which are used to compute the residual phase values corresponding to the respective periods of the intensity pattern at the points of the object to be surveyed and computing from the residual phase values the heights of the points of the object with respect to a reference plane corresponding to a predefined phase position of the intesity patters; and
computing the absolute heights of the points of the object to be surveyed with respect to said reference plane, from said residual phase values for a number of different periods and defined phase positions with respect to the points of the object to be surveyed and the reference plane of said intensity patterns of the beam of radiation directed at the object.

11. A method as claimed in claim 10, wherein said directing step is accomplished by using a first and a second intensity pattern, the period lambda(1) of the first pattern being greater than the period lambda(2) of the second pattern.

12. A method as claimed in claim 11, wherein the relation q*lambda(2)=p*lambda(1)

with p, q being integral numbers and p−q=1 holds, and wherein said computing step is accomplished by using the relation z=lambda(1)*[p*M(2)−q*phi(1)+p*phi(2)], wherein $$M(2) = \begin{cases} 0, \text{ if phi(2)} \geq \text{phi(1)} \\ 1, \text{ if phi(2) less than phi(1),} \end{cases}$$

z are the absolute heights and phi(1), phi(2) are residual phase values.

13. A method as claimed in claim 10, further including the steps of;
detecting and storing further intensity values for a period substantially smaller than the periods of the beam of radiation used in said former detecting and storing step;
combining said further detected intensity values for computing further corresponding residual phase values; and
computing absolute heights of improved accuracy from said further corresponding residual phase values and from the absolute heights already computed in said former computing step.

14. A method as claimed in claim 13, wherein said modulating step is accomplished by using a grating.

15. A method as claimed in claim 14, wherein said grating has linear parallel fringe patterns with bright and dark fringes of equal width as periodically varying intensity patterns and by using two intensity patterns with different periods lambda; and wherein said combining step is accomplished by using intensity values where the defined phase positions of the two intensity patterns for computing the residual phase values coincide, and by computing the residual phase values phi by summing groups A, B, C. D... of the intensity values, forming differences between the summed groups, and dividing some differences of said groups by other differences of said groups.

16. An apparatus for surveying the surface of an object comprising:
means for directing at the object a beam of radiation having a periodically varying intensity pattern along a diameter of the beam;
means for modulating the phases of the intensity pattern of the beam of radiation directed at the object at the points to be surveyed;
means for detecting and storing the intensity values at the points of the object to be surveyed for a number of different modulated phases and periods of the beam of radiation directed at the object;
means for combining the detected intensity values, which are used to compute the residual phase values within the respective periods of the intensity pattern at the points of the object surface to be surveyed for defined phase positions of the intensity patterns with respect to a reference plane, which are used to compute the heights of the points of the object surface with respect to a reference plane.

17. An apparatus as claimed in claim 1, wherein said means for directing and for modulating comprise a number of gratings, with linear parallel fringes with different periods in the path of said beam of radiation.

18. An apparatus as claimed in claim 17, wherein said gratings are mountied on a common carrier.

19. An apparatus as claimed in claim 18, further including at least one further grating with reference marks mounted on said common carrier, said gratings with linear parallel fringes having defined phase positions with respect to said one further grating, and
a means for displacing said common carrier and for scanning said one further grating in order to position said gratings with linear parallel fringes within said beam of radiation to provide the corresponding intensity patterns with the required predefined phase positions.

* * * * *